US012201578B1

(12) United States Patent
Danby et al.

(10) Patent No.: US 12,201,578 B1
(45) **Date of Patent: *Jan. 21, 2025**

(54) MASSAGE DEVICE WITH A RELEASABLE CONNECTION FOR A MASSAGING HEAD

(71) Applicant: HYPERICE IP SUBCO, LLC, Irvine, CA (US)

(72) Inventors: Philip C. Danby, Key Biscayne, FL (US); John Charles Danby, Witham (GB)

(73) Assignee: HYPERICE IP SUBCO, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/760,994

(22) Filed: Jul. 1, 2024

Related U.S. Application Data

(63) Continuation of application No. 18/466,702, filed on Sep. 13, 2023, which is a continuation of application (Continued)

(51) Int. Cl.
*A61H 23/06* (2006.01)
*A61H 23/02* (2006.01)

(52) U.S. Cl.
CPC . *A61H 23/0254* (2013.01); *A61H 2201/0107* (2013.01); *A61H 2201/0153* (2013.01); *A61H 2201/0157* (2013.01); *A61H 2201/1215* (2013.01); *A61H 2201/1418* (2013.01); *A61H 2201/149* (2013.01); *A61H 2201/1664* (2013.01); *A61H 2201/5005* (2013.01); *A61H 2201/501* (2013.01);

(Continued)

(58) Field of Classification Search
CPC ........ A61H 23/0254; A61H 2201/0107; A61H 2201/0153; A61H 2201/0157; A61H 2201/1215; A61H 2201/1418; A61H 2201/149; A61H 2201/1664; A61H 2201/5005; A61H 2201/5035; A61H 2201/5038
See application file for complete search history.

(56) References Cited

U.S. PATENT DOCUMENTS

| | | | |
|---|---|---|---|
| 784,024 | A | 3/1905 | Barrett et al. |
| 799,881 | A | 9/1905 | Wells |

(Continued)

FOREIGN PATENT DOCUMENTS

| | | | |
|---|---|---|---|
| CA | 188544 | A | 2/1919 |
| CA | 188545 | A | 2/1919 |

(Continued)

OTHER PUBLICATIONS

U.S. Appl. No. 17/083,118 Published as: US2021/0038472, System and Process for Determining Pressure Settings for a Percussive Massage Applicator, filed Oct. 28, 2020.

(Continued)

*Primary Examiner* — Timothy A Stanis
(74) *Attorney, Agent, or Firm* — Goodwin Procter LLP

(57) ABSTRACT

Exemplary embodiments of massaging devices are disclosed herein. One exemplary embodiment includes a piston having a longitudinal axis, a massaging head connected to the piston, a motor located on a first side of the longitudinal axis and a handle located on a second side of the longitudinal axis. A drive mechanism for moving the piston and massage head is also included.

14 Claims, 7 Drawing Sheets

Related U.S. Application Data

No. 17/681,367, filed on Feb. 25, 2022, now Pat. No. 11,857,482, which is a continuation of application No. 15/892,665, filed on Feb. 9, 2018, now Pat. No. 11,285,075, which is a continuation of application No. 14/317,573, filed on Jun. 27, 2014, now Pat. No. 9,889,066.

(60) Provisional application No. 61/841,693, filed on Jul. 1, 2013.

(52) U.S. Cl.
CPC ................ *A61H 2201/5015* (2013.01); *A61H 2201/5035* (2013.01); *A61H 2201/5038* (2013.01); *A61H 2201/5097* (2013.01)

(56) References Cited

U.S. PATENT DOCUMENTS 863,525 A 12/1907 Gardy
873,123 A 12/1907 Gardy
1,269,803 A 6/1918 Elmen et al.
1,339,179 A 5/1920 Elmen
1,594,636 A 8/1926 Smith
1,612,981 A 1/1927 Mraula
1,657,765 A 1/1928 Pasque
1,784,301 A 12/1930 Mekler
1,978,223 A 10/1934 Parker
2,078,025 A 4/1937 Samuels
3,030,647 A 4/1962 Peyron
D197,889 S 4/1964 Hass
3,494,353 A 2/1970 Marich
3,626,934 A 12/1971 Andis
3,696,693 A 10/1972 Bosten et al.
3,699,952 A 10/1972 Waters et al.
3,705,578 A 12/1972 Cutler et al.
3,710,785 A 1/1973 Hilger
3,837,335 A 9/1974 Teranishi
3,841,321 A 10/1974 Albach et al.
3,845,758 A 11/1974 Anderson
3,920,291 A 11/1975 Wendel et al.
3,968,789 A 7/1976 Simoncini
3,993,052 A 11/1976 Miyahara
4,079,733 A 3/1978 Denton et al.
4,088,128 A 5/1978 Mabuchi
4,149,530 A 4/1979 Gow
4,150,668 A 4/1979 Johnston
4,162,675 A 7/1979 Kawada
4,173,217 A 11/1979 Johnston
RE30,500 E 2/1981 Springer et al.
4,412,535 A 11/1983 Teren
4,505,267 A 3/1985 Inada
4,513,737 A 4/1985 Mabuchi
4,523,580 A 6/1985 Tureaud
4,549,535 A 10/1985 Wing
4,566,442 A 1/1986 Mabuchi et al.
4,691,693 A 9/1987 Sato
4,698,869 A 10/1987 Mierau et al.
4,709,201 A 11/1987 Schaefer et al.
4,726,430 A 2/1988 Hendrikx et al.
4,730,605 A 3/1988 Noble et al.
4,751,452 A 6/1988 Kilmer et al.
4,790,296 A 12/1988 Segal
4,827,914 A 5/1989 Kamazawa
4,841,955 A 6/1989 Evans et al.
4,858,600 A 8/1989 Gross et al.
4,880,713 A 11/1989 Levine
4,989,613 A 2/1991 Finkenberg
5,043,651 A 8/1991 Tamura
5,063,911 A 11/1991 Teranishi
5,065,743 A 11/1991 Sutherland
D323,034 S 1/1992 Reinstein
D323,606 S 2/1992 Chang
5,085,207 A 2/1992 Fiore
5,134,777 A 8/1992 Meyer et al.
5,140,979 A 8/1992 Nakagawa
D329,291 S 9/1992 Wollman
D329,292 S 9/1992 Wollman
5,159,922 A 11/1992 Mabuchi et al.
D331,467 S 12/1992 Wollman
D335,073 S 4/1993 Anthony et al.
5,215,051 A 6/1993 Smith
5,215,078 A 6/1993 Fulop
5,305,738 A 4/1994 Shimizu
5,311,860 A 5/1994 Doria
5,364,223 A 11/1994 Bissex
5,415,621 A 5/1995 Campbell
5,417,644 A 5/1995 Lee
5,447,491 A 9/1995 Bellandi et al.
5,469,860 A 11/1995 De Santis
5,489,280 A 2/1996 Russell
D367,712 S 3/1996 Young
D373,640 S 9/1996 Young
5,569,168 A 10/1996 Hartwig
5,573,500 A 11/1996 Katsunuma et al.
D377,100 S 12/1996 Gladieux, Jr.
5,602,432 A 2/1997 Mizutani
D378,338 S 3/1997 Acciville et al.
5,632,720 A 5/1997 Kleitz
D379,580 S 6/1997 Amundsen
5,656,017 A 8/1997 Keller et al.
5,656,018 A 8/1997 Tseng
D388,175 S 12/1997 Lie
5,725,483 A 3/1998 Podolsky
5,733,029 A 3/1998 Monroe
5,769,657 A 6/1998 Kondo et al.
5,797,462 A 8/1998 Rahm
5,803,916 A 9/1998 Kuznets et al.
D403,220 S 12/1998 Kimata et al.
5,843,006 A 12/1998 Phillips et al.
D407,498 S 3/1999 Cooper
D408,241 S 4/1999 Jansson
5,925,002 A 7/1999 Wollman
5,935,089 A 8/1999 Shimizu
5,951,501 A 9/1999 Griner
6,051,957 A 4/2000 Klein
6,102,875 A 8/2000 Jones
D430,938 S 9/2000 Lee
6,123,657 A 9/2000 Ishikawa et al.
6,165,145 A 12/2000 Noble
6,170,108 B1 1/2001 Knight
D437,713 S 2/2001 Young
D438,309 S 2/2001 Young
6,228,042 B1 5/2001 Dungan
6,231,497 B1 5/2001 Souder
D448,852 S 10/2001 Engelen
6,357,125 B1 3/2002 Feldmann et al.
D455,837 S 4/2002 Kim
6,375,609 B1 4/2002 Hastings et al.
6,401,289 B1 6/2002 Herbert
6,402,710 B1 6/2002 Hsu
D460,675 S 7/2002 Morgan
6,432,072 B1 8/2002 Harris et al.
6,440,091 B1 8/2002 Hirosawa
6,461,377 B1 10/2002 An
6,478,755 B2 11/2002 Young
D467,148 S 12/2002 Flickinger
6,494,849 B2 12/2002 Kuo
6,503,211 B2 1/2003 Frye
6,537,236 B2 3/2003 Tucek et al.
D474,089 S 5/2003 Huang
6,577,287 B2 6/2003 Havel
6,581,596 B1 6/2003 Truitt et al.
D476,746 S 7/2003 Harris et al.
6,585,667 B1 7/2003 Muller
6,602,211 B2 8/2003 Tucek
6,616,621 B1 9/2003 Kohr
6,656,140 B2 12/2003 Oguma et al.
6,663,657 B1 12/2003 Miller
6,682,496 B1 1/2004 Pivaroff
D487,219 S 3/2004 Chudy et al.
6,758,826 B2 7/2004 Luettgen et al.
6,805,700 B2 10/2004 Miller

(56) References Cited

U.S. PATENT DOCUMENTS

D498,128 S 11/2004 Sterling
6,832,991 B1 12/2004 Inada et al.
6,866,776 B2 3/2005 Leason et al.
6,979,300 B1 12/2005 Julian et al.
6,994,679 B1 2/2006 Lee
7,033,329 B2 4/2006 Liao
7,041,072 B2 5/2006 Calvert
7,083,581 B2 8/2006 Tsai
7,125,390 B2 10/2006 Ferber et al.
7,128,722 B2 10/2006 Lev et al.
D531,733 S 11/2006 Burout, III et al.
7,144,417 B2 12/2006 Colloca et al.
7,169,169 B2 1/2007 Tucek et al.
D536,591 S 2/2007 Ghode et al.
7,211,057 B2 5/2007 Gleason et al.
D544,102 S 6/2007 Pivaroff
7,229,424 B2 6/2007 Jones et al.
7,238,162 B2 7/2007 Dehli
D548,354 S 8/2007 Lai
7,264,598 B2 9/2007 Shin
7,270,641 B2 9/2007 Glucksman et al.
D553,252 S 10/2007 Masuda
7,282,036 B2 10/2007 Masuda
7,282,037 B2 10/2007 Cho
D555,255 S 11/2007 Masuda
7,306,569 B2 12/2007 LaJoie et al.
7,322,946 B2 1/2008 Lev et al.
7,335,170 B2 2/2008 Milne et al.
7,354,408 B2 4/2008 Muchisky
D581,542 S 11/2008 Ferber et al.
D581,543 S 11/2008 Ferber et al.
D582,049 S 12/2008 Ferber et al.
7,470,242 B2 12/2008 Ferber et al.
7,503,923 B2 3/2009 Miller
7,507,198 B2 3/2009 Ardizzone et al.
7,517,327 B1 4/2009 Knight
7,597,669 B2 10/2009 Huang
D606,192 S 12/2009 Summerer et al.
7,629,766 B2 12/2009 Sadow
7,634,314 B2 12/2009 Applebaum et al.
7,658,012 B2 2/2010 James et al.
D613,416 S 4/2010 Schupman
D625,164 S 10/2010 Aglassinger
D627,897 S 11/2010 Yde et al.
D627,898 S 11/2010 Aulwes et al.
7,927,259 B1 4/2011 Rix
7,927,294 B2 4/2011 Kamimura et al.
7,976,485 B2 7/2011 Huang
D649,657 S 11/2011 Petersen et al.
8,052,625 B2 11/2011 Tsai et al.
8,083,699 B2 12/2011 Colloca et al.
8,092,407 B2 1/2012 Tsukada et al.
D658,759 S 5/2012 Marescaux et al.
8,192,379 B2 6/2012 Huang
D665,915 S 8/2012 Ma
8,282,583 B2 10/2012 Tsai
8,317,733 B2 11/2012 Chen et al.
8,342,187 B2 1/2013 Kalman et al.
8,435,194 B2 5/2013 Dverin et al.
8,475,362 B2 7/2013 Sohn et al.
8,632,525 B2 1/2014 Kerr et al.
8,673,487 B2 3/2014 Churchill
D703,337 S 4/2014 Fuhr et al.
D706,433 S 6/2014 Fuhr et al.
D708,742 S 7/2014 Dallemagne et al.
8,826,547 B2 9/2014 Oberheim
8,841,871 B2 9/2014 Yang et al.
D719,273 S 12/2014 Chen
8,951,216 B2 2/2015 Yoo et al.
D725,790 S 3/2015 Givord
D725,978 S 4/2015 Uematsu et al.
9,017,355 B2 4/2015 Smith et al.
D734,863 S 7/2015 Hennessey
D735,348 S 7/2015 Hennessey
9,107,690 B2 8/2015 Bales, Jr. et al.
D738,516 S 9/2015 Karim
9,272,141 B2 3/2016 Nichols
D752,936 S 4/2016 King et al.
D757,953 S 5/2016 Philips
9,333,371 B2 5/2016 Bean et al.
D759,237 S 6/2016 Heath et al.
D759,238 S 6/2016 Heath et al.
D759,831 S 6/2016 Levi et al.
9,364,626 B2 6/2016 Carter et al.
D763,442 S 8/2016 Price et al.
D778,439 S 2/2017 Hakansson et al.
9,756,402 B2 9/2017 Stampfl et al.
D810,280 S 2/2018 Tharp et al.
9,889,066 B2 2/2018 Danby et al.
D819,221 S 5/2018 Lei
D823,478 S 7/2018 Park
D825,073 S 8/2018 Lenke
D827,842 S 9/2018 Bainton et al.
D827,843 S 9/2018 Bainton et al.
10,162,106 B1 12/2018 Grillo et al.
D837,395 S 1/2019 Gan
D838,378 S 1/2019 Cao
D840,032 S 2/2019 Clifford et al.
D840,547 S 2/2019 Harle et al.
10,201,470 B2 2/2019 Griner
D842,491 S 3/2019 Fleming et al.
D843,002 S 3/2019 Yarborough et al.
D843,656 S 3/2019 Zhang et al.
D844,896 S 4/2019 Levi et al.
D845,499 S 4/2019 Wersland et al.
D847,362 S 4/2019 Tang
D847,364 S 4/2019 Lee et al.
10,245,033 B2 4/2019 Overmyer et al.
D847,990 S 5/2019 Kimball
D848,089 S 5/2019 Cunniff
D849,260 S 5/2019 Wersland et al.
D850,640 S 6/2019 Wersland et al.
10,314,762 B1 6/2019 Marton et al.
10,357,425 B2 7/2019 Wersland et al.
D855,822 S 8/2019 Marton et al.
D865,192 S 10/2019 Nazarian
10,456,325 B2 10/2019 Fan
10,470,970 B2 11/2019 Nazarian et al.
D869,928 S 12/2019 Hsiao
10,492,984 B2 12/2019 Marton et al.
10,561,574 B1 2/2020 Marton et al.
D879,290 S 3/2020 Harman et al.
10,617,588 B2 4/2020 Wersland et al.
D890,353 S 7/2020 Nazarian
D890,942 S 7/2020 Wersland et al.
D890,943 S 7/2020 Wersland et al.
10,702,448 B2 7/2020 Wersland et al.
10,743,650 B2 8/2020 Katano et al.
D896,393 S 9/2020 Wersland et al.
10,774,860 B2 9/2020 Wersland et al.
D903,140 S 11/2020 Andrejs
10,847,984 B2 11/2020 Solana et al.
10,857,064 B2 12/2020 Wersland et al.
D907,792 S 1/2021 Marton et al.
D908,235 S 1/2021 Marton et al.
10,888,492 B2 1/2021 Marton et al.
D910,870 S 2/2021 Marton et al.
10,905,627 B2 2/2021 Marton et al.
10,912,708 B2 2/2021 Marton et al.
D918,404 S 5/2021 Wersland et al.
10,993,874 B1 5/2021 Marton et al.
D928,334 S 8/2021 Chou
D932,036 S 9/2021 Nazarian
11,166,863 B2 11/2021 Wersland et al.
D946,166 S 3/2022 Li
D949,365 S 4/2022 Li
D949,416 S 4/2022 Khubani et al.
D949,417 S 4/2022 Khubani et al.
D949,418 S 4/2022 Khubani et al.
D952,878 S 5/2022 Lin
D970,743 S 11/2022 Brailey
2002/0058892 A1 5/2002 Young
2002/0161315 A1 10/2002 Harris et al.
2002/0177795 A1 11/2002 Frye

(56) References Cited

U.S. PATENT DOCUMENTS

| | | | |
|---|---|---|---|
| 2002/0188233 | A1 | 12/2002 | Denyes |
| 2003/0009116 | A1 | 1/2003 | Luettgen et al. |
| 2003/0014079 | A1 | 1/2003 | Tucek |
| 2003/0028134 | A1 | 2/2003 | Lev et al. |
| 2003/0060741 | A1 | 3/2003 | Park |
| 2003/0114781 | A1 | 6/2003 | Beaty et al. |
| 2003/0130602 | A1 | 7/2003 | Chang |
| 2003/0144615 | A1 | 7/2003 | Lin |
| 2003/0195438 | A1 | 10/2003 | Petillo |
| 2003/0195443 | A1 | 10/2003 | Miller |
| 2003/0218045 | A1 | 11/2003 | Shkolnikov |
| 2004/0010268 | A1 | 1/2004 | Gabehart |
| 2004/0144553 | A1 | 7/2004 | Ashbaugh |
| 2004/0254507 | A1 | 12/2004 | Off |
| 2005/0015030 | A1 | 1/2005 | Bousfield et al. |
| 2005/0075591 | A1 | 4/2005 | Hafemann |
| 2005/0096571 | A1 | 5/2005 | Miki |
| 2005/0096682 | A1 | 5/2005 | Daffer |
| 2005/0113870 | A1 | 5/2005 | Miller |
| 2005/0131461 | A1 | 6/2005 | Tucek et al. |
| 2005/0192519 | A1 | 9/2005 | Crunick |
| 2005/0203448 | A1 | 9/2005 | Harris et al. |
| 2006/0025710 | A1 | 2/2006 | Schulz et al. |
| 2006/0058714 | A1 | 3/2006 | Rhoades |
| 2006/0074360 | A1 | 4/2006 | Yu |
| 2006/0116614 | A1 | 6/2006 | Jones et al. |
| 2006/0178040 | A1 | 8/2006 | Kurosawa |
| 2006/0178715 | A1 | 8/2006 | Ahn et al. |
| 2006/0211961 | A1 | 9/2006 | Meyer et al. |
| 2006/0293711 | A1 | 12/2006 | Keller et al. |
| 2007/0144310 | A1 | 6/2007 | Pozgay et al. |
| 2007/0150004 | A1 | 6/2007 | Colloca et al. |
| 2007/0154783 | A1 | 7/2007 | Jeon |
| 2007/0179414 | A1 | 8/2007 | Imboden et al. |
| 2007/0257638 | A1 | 11/2007 | Amend et al. |
| 2008/0196553 | A1 | 8/2008 | Hoffmann et al. |
| 2008/0214968 | A1 | 9/2008 | Milne et al. |
| 2008/0234611 | A1 | 9/2008 | Sakai et al. |
| 2008/0243039 | A1 | 10/2008 | Rhoades |
| 2008/0262397 | A1 | 10/2008 | Habatjou |
| 2008/0262399 | A1 | 10/2008 | Kovelman et al. |
| 2008/0275371 | A1 | 11/2008 | Hoffmann |
| 2008/0306417 | A1 | 12/2008 | Imboden et al. |
| 2009/0000039 | A1 | 1/2009 | St. John et al. |
| 2009/0005812 | A1 | 1/2009 | Fuhr |
| 2009/0182249 | A1 | 7/2009 | Sakai et al. |
| 2009/0270915 | A1 | 10/2009 | Tsai et al. |
| 2009/0286145 | A1 | 11/2009 | Wan et al. |
| 2009/0306577 | A1 | 12/2009 | Akridge et al. |
| 2010/0116517 | A1 | 5/2010 | Katzenberger et al. |
| 2010/0145242 | A1 | 6/2010 | Tsai |
| 2010/0160841 | A1 | 6/2010 | Wu |
| 2010/0164434 | A1 | 7/2010 | Cacioppo et al. |
| 2010/0185127 | A1 | 7/2010 | Nilsson et al. |
| 2010/0228168 | A1 | 9/2010 | Xu et al. |
| 2010/0252294 | A1 | 10/2010 | Kondo et al. |
| 2010/0274162 | A1 | 10/2010 | Evans |
| 2010/0331745 | A1 | 12/2010 | Yao |
| 2011/0017742 | A1 | 1/2011 | Sausen et al. |
| 2011/0087141 | A1 | 4/2011 | Wagy et al. |
| 2011/0106067 | A1 | 5/2011 | Geva et al. |
| 2011/0169481 | A1 | 7/2011 | Nguyen et al. |
| 2012/0038483 | A1 | 2/2012 | Du et al. |
| 2012/0120573 | A1 | 5/2012 | Bentley |
| 2012/0197357 | A1 | 8/2012 | Dewey et al. |
| 2012/0215141 | A1 | 8/2012 | Peddicord |
| 2012/0253245 | A1 | 10/2012 | Stanbridge |
| 2012/0259255 | A1 | 10/2012 | Tomlinson et al. |
| 2012/0281392 | A1 | 11/2012 | Workman et al. |
| 2012/0296244 | A1 | 11/2012 | Ceoldo et al. |
| 2013/0006040 | A1 | 1/2013 | Lee |
| 2013/0030506 | A1 | 1/2013 | Bartolone et al. |
| 2013/0076271 | A1 | 3/2013 | Suda et al. |
| 2013/0102937 | A1 | 4/2013 | Ehrenreich et al. |
| 2013/0112451 | A1 | 5/2013 | Kondo et al. |
| 2013/0138023 | A1 | 5/2013 | Lerro |
| 2013/0261516 | A1 | 10/2013 | Cilea et al. |
| 2013/0281897 | A1 | 10/2013 | Hoffmann et al. |
| 2013/0289457 | A1 | 10/2013 | Young et al. |
| 2013/0294019 | A1 | 11/2013 | LaSota et al. |
| 2014/0014384 | A1 | 1/2014 | Horie et al. |
| 2014/0031866 | A1 | 1/2014 | Fuhr et al. |
| 2014/0094724 | A1 | 4/2014 | Freeman |
| 2014/0159507 | A1 | 6/2014 | Johnson et al. |
| 2014/0221887 | A1 | 8/2014 | Wu |
| 2014/0288473 | A1 | 9/2014 | Matsushita |
| 2015/0005682 | A1 | 1/2015 | Danby et al. |
| 2015/0107383 | A1 | 4/2015 | Duesselberg et al. |
| 2015/0119771 | A1 | 4/2015 | Roberts |
| 2015/0148592 | A1 | 5/2015 | Kanbar et al. |
| 2015/0182415 | A1 | 7/2015 | Olkowski et al. |
| 2015/0366746 | A1 | 12/2015 | Ashby |
| 2016/0151238 | A1 | 6/2016 | Crunick et al. |
| 2016/0256348 | A1 | 9/2016 | Giraud et al. |
| 2016/0271009 | A1 | 9/2016 | Giraud et al. |
| 2016/0278436 | A1 | 9/2016 | Verleur et al. |
| 2016/0354277 | A1 | 12/2016 | Fima |
| 2016/0367425 | A1 | 12/2016 | Wersland |
| 2017/0012257 | A1 | 1/2017 | Wackwitz et al. |
| 2017/0027798 | A1 | 2/2017 | Wersland |
| 2017/0028160 | A1 | 2/2017 | Oliver |
| 2017/0087379 | A1 | 3/2017 | Sedic |
| 2017/0304145 | A1 | 10/2017 | Pepe |
| 2017/0333280 | A1 | 11/2017 | Black |
| 2018/0008512 | A1 | 1/2018 | Goldstein |
| 2018/0154141 | A1 | 6/2018 | Ahn |
| 2018/0168913 | A1 | 6/2018 | Sedic |
| 2018/0200141 | A1 | 7/2018 | Wersland et al. |
| 2018/0263845 | A1 | 9/2018 | Wersland et al. |
| 2019/0015294 | A1 | 1/2019 | Nazarian et al. |
| 2019/0091096 | A1 | 3/2019 | Patel |
| 2019/0125972 | A1 | 5/2019 | Srinivasan et al. |
| 2019/0175434 | A1 | 6/2019 | Zhang |
| 2019/0198828 | A1 | 6/2019 | Zanon et al. |
| 2019/0209424 | A1 | 7/2019 | Wersland et al. |
| 2019/0232403 | A1 | 8/2019 | Candelaria |
| 2019/0254921 | A1 | 8/2019 | Marton et al. |
| 2019/0254922 | A1 | 8/2019 | Marton et al. |
| 2019/0350793 | A1 | 11/2019 | Wersland et al. |
| 2020/0069510 | A1 | 3/2020 | Wersland et al. |
| 2020/0093945 | A1 | 3/2020 | Jeong |
| 2020/0128935 | A1 | 4/2020 | Turner |
| 2020/0222263 | A1 | 7/2020 | Wersland et al. |
| 2020/0261306 | A1 | 8/2020 | Pepe |
| 2020/0261307 | A1 | 8/2020 | Wersland et al. |
| 2020/0261310 | A1 | 8/2020 | Wersland et al. |
| 2020/0274162 | A1 | 8/2020 | Galceran Mestres et al. |
| 2020/0276079 | A1 | 9/2020 | Cheng |
| 2020/0289365 | A1 | 9/2020 | Wersland et al. |
| 2020/0329858 | A1 | 10/2020 | Katano et al. |
| 2020/0330321 | A1 | 10/2020 | Wersland et al. |
| 2020/0352820 | A1 | 11/2020 | Nazarian et al. |
| 2020/0352821 | A1 | 11/2020 | Wersland et al. |
| 2020/0405574 | A1 | 12/2020 | Wersland et al. |
| 2021/0022955 | A1 | 1/2021 | Wersland et al. |

FOREIGN PATENT DOCUMENTS

| | | | |
|---|---|---|---|
| CA | 188553 | A | 2/1919 |
| CA | 1042745 | A | 11/1978 |
| CA | 2440783 | A1 | 3/2004 |
| CN | 2049126 | U | 12/1989 |
| CN | 2144503 | Y | 10/1993 |
| CN | 2207816 | Y | 9/1995 |
| CN | 1149446 | A | 5/1997 |
| CN | 1228299 | A | 9/1999 |
| CN | 2412567 | Y | 1/2001 |
| CN | 2540948 | Y | 3/2003 |
| CN | 2694966 | Y | 4/2005 |
| CN | 201478387 | U | 5/2010 |
| CN | 101801326 | A | 8/2010 |
| CN | 202459196 | U | 10/2012 |
| CN | 202478137 | U | 10/2012 |
| CN | 202536467 | U | 11/2012 |

(56) References Cited

FOREIGN PATENT DOCUMENTS

| | | | |
|---|---|---|---|
| CN | 101958410 | B | 1/2013 |
| CN | 103248096 | A | 8/2013 |
| CN | 203195947 | U | 9/2013 |
| CN | 103398298 | A | 11/2013 |
| CN | 203395603 | U | 1/2014 |
| CN | 103655142 | A | 3/2014 |
| CN | 204208018 | U | 3/2015 |
| CN | 204246459 | U | 4/2015 |
| CN | 204814773 | U | 12/2015 |
| CN | 205017429 | U | 2/2016 |
| CN | 205251993 | U | 5/2016 |
| CN | 205268525 | U | 6/2016 |
| CN | 205458346 | U | 8/2016 |
| CN | 106491005 | A | 3/2017 |
| CN | 206183628 | U | 5/2017 |
| CN | 106806103 | A | 6/2017 |
| CN | 206333979 | U | 7/2017 |
| CN | 206381369 | U | 8/2017 |
| CN | 206381373 | U | 8/2017 |
| CN | 206381389 | U | 8/2017 |
| CN | 107157741 | A | 9/2017 |
| CN | 206675699 | U | 11/2017 |
| CN | 304486625 | | 2/2018 |
| CN | 208130157 | U | 11/2018 |
| CN | 210301676 | U | 4/2020 |
| CN | 210872953 | U | 6/2020 |
| CN | 111759711 | A | 10/2020 |
| CN | 112451345 | A | 3/2021 |
| DE | 102012212256 | A1 | 1/2014 |
| DE | 202013012621 | U1 | 12/2017 |
| EM | 004377638-0002 | | 10/2017 |
| EP | 0040053 | A1 | 11/1981 |
| EP | 0158870 | A1 | 10/1985 |
| EP | 0666071 | A1 | 8/1995 |
| EP | 0572506 | B1 | 1/1997 |
| EP | 1728494 | A1 | 12/2006 |
| EP | 1620233 | B1 | 2/2007 |
| EP | 2510891 | B1 | 6/2016 |
| EP | 3062383 | A2 | 8/2016 |
| EP | 3235484 | A1 | 10/2017 |
| EP | 3320888 | A1 | 5/2018 |
| EP | 3435381 | A1 | 1/2019 |
| FI | 903376 | A | 12/1991 |
| GB | 191209026 | A | 3/1913 |
| GB | 191509508 | A | 6/1916 |
| GB | 188946 | A | 11/1922 |
| GB | 213117 | A | 3/1924 |
| GB | 1293876 | A | 10/1972 |
| JP | S54110058 | A | 8/1979 |
| JP | S6389158 | A | 4/1988 |
| JP | H04250161 | A | 9/1992 |
| JP | H053903 | A | 1/1993 |
| JP | H0751393 | A | 2/1995 |
| JP | H0733329 | B2 | 6/1995 |
| JP | H07153440 | A | 6/1995 |
| JP | H0866448 | A | 3/1996 |
| JP | H08131500 | A | 5/1996 |
| JP | H0992246 | A | 4/1997 |
| JP | 2781408 | B2 | 7/1998 |
| JP | 2999872 | B2 | 1/2000 |
| JP | 2002218780 | A | 8/2002 |
| JP | 2003230613 | A | 8/2003 |
| JP | 2004024523 | A | 1/2004 |
| JP | 2004141568 | A | 5/2004 |
| JP | 3813828 | B2 | 8/2006 |
| JP | 2007044319 | A | 2/2007 |
| JP | 2009291451 | A | 12/2009 |
| JP | 2010075288 | A | 4/2010 |
| JP | 5859905 | B2 | 2/2016 |
| JP | 1683409 | S | 4/2021 |
| KR | 20000043488 | A | 7/2000 |
| KR | 20030008342 | A | 1/2003 |
| KR | 200311328 | Y1 | 5/2003 |
| KR | 20060074625 | A | 7/2006 |
| KR | 200422971 | Y1 | 8/2006 |
| KR | 100785097 | B1 | 12/2007 |
| KR | 20090128807 | A | 12/2009 |
| KR | 2010-0023508 | A | 3/2010 |
| KR | 101007827 | B1 | 1/2011 |
| KR | 101162978 | B1 | 7/2012 |
| KR | 101315314 | B1 | 10/2013 |
| KR | 101504885 | B1 | 3/2015 |
| KR | 101649522 | B1 | 8/2016 |
| KR | 3010427980000 | | 1/2020 |
| KR | 102078829 | B1 | 2/2020 |
| RU | 2053754 | C1 | 2/1996 |
| RU | 2464005 | C1 | 10/2012 |
| TW | M272528 | U | 8/2005 |
| TW | M379178 | U | 4/2010 |
| TW | M402573 | U | 4/2011 |
| TW | M433702 | U | 7/2012 |
| TW | M493379 | U | 1/2015 |
| TW | M543692 | U | 6/2017 |
| TW | D202371 | S | 1/2020 |
| TW | 202017550 | A | 5/2020 |
| TW | M599159 | U | 8/2020 |
| WO | WO-9214435 | A1 | 9/1992 |
| WO | WO-9625908 | A1 | 8/1996 |
| WO | WO-03006102 | A2 | 1/2003 |
| WO | WO-2008/113139 | A1 | 9/2008 |
| WO | WO-2009/014727 | A1 | 1/2009 |
| WO | WO-2011122812 | A2 | 10/2011 |
| WO | WO-2011/159906 | A2 | 12/2011 |
| WO | WO-2012/134469 | A1 | 10/2012 |
| WO | WO-2012/177028 | A2 | 12/2012 |
| WO | WO-2013/141359 | A1 | 9/2013 |
| WO | WO-2014/038359 | A1 | 3/2014 |
| WO | WO-2014118596 | A1 | 8/2014 |
| WO | WO-2015038005 | A2 | 3/2015 |
| WO | WO-2017/123841 | A2 | 7/2017 |
| WO | WO-2017/184505 | A2 | 10/2017 |
| WO | WO-2020/101725 | A1 | 5/2020 |
| WO | WO-2020/227225 | A1 | 11/2020 |
| WO | WO-2020/227230 | A1 | 11/2020 |
| WO | WO-2020/227569 | A1 | 11/2020 |

OTHER PUBLICATIONS

U.S. Appl. No. 18/466,702 Published as: 2024/0000656, Massage Device Having Variable Stroke Length, filed Sep. 13, 2023.

U.S. Appl. No. 18/515,119, Massage Device Having Variable Stroke Length, filed Nov. 20, 2023.

U.S. Appl. No. 18/515,122, Massage Device Having a Predetermined Stroke Length, filed Nov. 20, 2023.

U.S. Appl. No. 18/760,568, Massage Device With a Releasable Connection for a Massaging Head, filed Jul. 1, 2024.

U.S. Appl. No. 18/515,126, Massage Device With a Releasable Connection for a Massaging Head, filed Nov. 20, 2023.

U.S. Appl. No. 18/760,576, Massage Device With a Releasable Connection for a Massaging Head, filed Jul. 1, 2024.

U.S. Appl. No. 18/760,773, Massage Device With a Releasable Connection for a Massaging Head, filed Jul. 1, 2024.

U.S. Appl. No. 18/761,049, Massage Device With a Releasable Connection for a Massaging Head, filed Jul. 1, 2024.

U.S. Appl. No. 17/972,421 Published as: 2023/0042943, Percussive Massage Device With Selectable Stroke Length, filed Oct. 24, 2022.

U.S. Appl. No. 17/136,218 Published as: US2021/0361524, Battery-Powered Percussive Massage Device, filed Dec. 29, 2020.

U.S. Appl. No. 18/342,158, Percussive Massage Device With Self-Lubricating Cylinder, filed Jun. 27, 2023.

U.S. Appl. No. 18/452,274, Motor and Piston Assembly for Percussive Device, filed Aug. 18, 2023.

U.S. Appl. No. 17/402,201 Published as: US2023/0048861, Combination Applicator and Adaptor for Percussive Massage Device, filed Aug. 13, 2021.

Amazon, "Theragun G3PRO Percussive Therapy Device", (Feb. 13, 2019)https://www.amazon.com/G3PRO-Percussive-Professional-Stimulator-Performance/dp/B07MJ2MCT3, 13 pages.

Campbell, D., "Jolt Therapy Tool," https://www.youtube.com/watch?v =-1nLjD-xRgl, Jul. 28, 2017, 3 pages.

(56) References Cited

OTHER PUBLICATIONS

Cavity—definition in the Cambridge English Dictionary; https://dictionary.cambridge.org/us/dictionary/english/cavity; retrieved Sep. 23, 2020 (9 pages).
Centech 4 in 1 Portable Power Pack Owner's Manual & Safety Instructions, 2014, 12 pages.
Christiana, A., "Porter-Cable PCL212ICC-2 12V Compact Lithium Two Tool Kit," Dec. 5, 2014, 5 pages.
Curriculum Vitae of Philip J. O'Keefe, PE (10 pages).
Declaration of Philip O'Keefe, P.E., in Support of Petition or Post-Grant Review dated Sep. 30, 2020 (136 pages).
DePuy Synthes Power Tools, "Battery Power Line II, User's Manual," for Battery-driven power tool system for orthopedics and traumatology, Dec. 2012, 83 pages.
DIY Jigsaw "Drill" Massager—Percussion Massager, Feb. 9, 2018, 19 pages.
http://web.archive.org/web/20100418041422/http://www.instructables.com:80/id/Jigsaw-Massager/ (Year: 2010), 6 pages.
Hyperlce PGR (Final Filing Draft); *Shenzhen Shufang Innovation Technology Co., Ltd.; Nenz Electric Technology (Dongguan) Co., Ltd.; Shenzhen Xinde Technology Co., Ltd.; Performance Health Systems, LLC; Yongkang Aijiu Industrial & Trade Co., Ltd.* (Petitioner) v. *Hyper Ice, Inc.* (Patent Owner) Petition for Post Grant Review U.S. Pat. No. 10,561,574 dated Sep. 30, 2020 (119 pages—uploaded in two parts p. 1-59 and p. 60-119).
Inner—definition in the Cambridge English Dictionary; https://dictionary.cambridge.org/us/dictionary/english/inner; retrieved Aug. 20, 2020 (2 pages).
International Preliminary Report on Patentability and Written Opinion of International Application No. PCT/US2021/057033 dated May 11, 2023, 9 pages.
International Preliminary Report on Patentability of International Application No. PCT/US2021/041073 dated Jan. 10, 2023, 10 pages.
International Preliminary Report on Patentability of corresponding International application PCT/US2018/053352, dated Aug. 27, 2020, 16 pages.
International Search Report and Written Opinion of PCT application No. PCT/US2021/057717, dated Feb. 23, 2022, 7 pages.
International Search Report and Written Opinion of PCT/US2019/013769 dated Aug. 9, 2019, 13 pages.
International Search Report and Written Opinion of PCT/US2021/057033 dated Feb. 16, 2022, 14 pages.
Knopp, B., "How to Change Jolt Attachments," https://www.youtube.com/watch?v=pl-vHxRtXUQ, Apr. 5, 2017, 6 pages.
Longitudinal—definition in the Cambridge English Dictionary; https://dictionary.cambridge.org/us/dictionary/english longitudinal; retrieved Sep. 22, 2020 (8 pages).
Microchip MCP73833/4 Stand-Along Linear Li-Ion / Li-Polymer Charge Management Controller; 2009 Microchip Technology Inc. (32 pages).
NutriKlick Deep Tissue Massage Gun, Date Unknown.
Outer—definition in the Cambridge English Dictionary; https://dictionary.cambridge.org/us/dictionary/english/outer; retrieved Sep. 22, 2020 (8 pages).
Perfomax 8 Volt Li-Ion Cordless Driver Owner's Manual, www.manualslib.com, Jul. 27, 2012, 19 pages.
Perimeter—definition in the Cambridge English Dictionary; https://dictionary.cambridge.org/us/dictionary/english/perimeter; retrieved Aug. 20, 2020 (1 page).
Practical Electronics for Inventors by Paul Scherz, 2000; (3 pages: cover, copyright page and p. 200).
Rachel [family name unknown], "Jigsaw Massager," Aug. 28, 2007, 8 pages. Information available online from http://www.instructables.com/id/jigsaw-massager/.
Office Action for U.S. Appl. No. 16/107,587, mailed Dec. 26, 2018, 36 pages.
Synthes Battery Power Line, Jun. 2009, 6 pages.
Theragun Owners Manual G2PRO, 16 pages.
Timtam Power Massage 1.5, Aug. 7, 2020, 4 pages.
TOPiando Multifunctional Massage Gun, 19 pages, date unknown.
Within—definition in the Cambridge English Dictionary; https://dictionary.cambridge.org/us/dictionary/english/within; retrieved Aug. 20, 2020 (3 pages).
Feb. 27, 2019 Office Action for U.S. Appl. No. 16/201,542.
Yu-Chung, C., "Electrolux Power Drill," www.design-inspiration.net/inspiration/yu-chung-chang-electrolux-power-drill/, Aug. 20, 2017, 4 pages.

MASSAGE DEVICE WITH A RELEASABLE CONNECTION FOR A MASSAGING HEAD

CROSS-REFERENCE TO RELATED APPLICATIONS

This application is a continuation of U.S. patent application Ser. No. 18/466,702 filed on Sep. 13, 2023, which is a continuation of U.S. patent application Ser. No. 17/681,367 filed on Feb. 25, 2022, which is a continuation of U.S. patent application Ser. No. 15/892,665 filed on Feb. 9, 2018, and entitled "MASSAGE DEVICE HAVING VARIABLE STROKE LENGTH", (now U.S. Pat. No. 11,285,075 issued on Mar. 29, 2022), which is a continuation of U.S. patent application Ser. No. 14/317,573 filed on Jun. 27, 2014, and entitled "MASSAGING DEVICE HAVING A HEAT SINK" (now U.S. Pat. No. 9,889,066 issued on Feb. 13, 2018), which claims priority to and the benefits of U.S. Provisional Patent Application No. 61/841,693 filed on Jul. 1, 2013, and entitled "MASSAGING DEVICE", the entireties of which are incorporated herein by reference.

BACKGROUND

This invention relates generally to medical devices, and more particularly, to a deep muscle-stimulating device used to increase muscle metabolism, increase the lactic acid cycle and relieve pain.

Vibrating massaging devices are available on the market today; however, those devices suffer from many deficiencies. Many of the prior art massaging devices are bulky, get very hot, are noisy and/or are difficult to use for extended periods of time.

SUMMARY

Exemplary embodiments of massaging devices are disclosed herein. One exemplary embodiment includes a piston having a longitudinal axis and a massaging head connected to the piston. A motor is located on a first side of the longitudinal axis and a handle is located on a second side of the longitudinal axis. A drive mechanism for moving the piston and massage head is also included.

Another exemplary embodiment of a massaging device includes a handle, a piston, a massaging head attached to the piston, a motor, a drive mechanism for converting rotary motion of the motor to linear motion to drive the piston back and forth in a reciprocating motion, a processor, memory, a data connection in circuit communication with the processor and logic for transmitting data between the massaging device and a remote device.

Still another exemplary embodiment includes a massaging device that has a handle, a motor, a drive mechanism for converting rotary motion of the motor to reciprocating motion, a piston movable in a linear reciprocating motion connected to the drive mechanism and a massage head attached to the piston. The exemplary embodiment also includes a heat sink in thermal communication with the motor and drive mechanism, and a housing having two cavities. The first cavity at least partially surrounds the motor and the second cavity at least partially surrounds the heat sink. The cavities are separated from one another and the second cavity includes one or more openings for allowing air to flow over the heat sink to dissipate heat from the massager.

Another exemplary massaging device includes a housing, a handle extending outward from the housing and a piston having a longitudinal axis extending substantially perpendicular to the handle. A massaging head is connected to the piston. In addition, the massaging device includes a motor, a drive mechanism for moving the piston and a control panel. The control panel is located on the housing above the handle.

In yet another exemplary embodiment, a massaging device includes a handle, a piston, a quick-connection mechanism and one or more massaging heads releasably connectable to the piston by the quick-connection mechanism. The massaging device further includes a motor and a drive mechanism for moving the piston.

Another exemplary massaging device includes a handle, a piston, a massaging head connected to the piston, a motor and a drive mechanism for moving the piston. The drive mechanism includes a crank bearing that has one or more spring bars.

Still yet, another exemplary massaging device includes a handle, a piston a massaging head connected to the piston, a drive mechanism for moving the piston in a back and forth motion and a lost motion mechanism located between the massaging head and the drive mechanism.

BRIEF DESCRIPTION OF THE DRAWINGS

These and other features and advantages of the present invention will become better understood with regard to the following description and accompanying drawings in which.

DETAILED DESCRIPTION

The Detailed Description merely describes exemplary embodiments of the invention and is not intended to limit the scope of the claims in any way. Indeed, the invention is broader than and unlimited by the exemplary embodiments, and unless specifically indicated otherwise, the terms used in the claims have their full ordinary meaning.

"Circuit communication" as used herein indicates a communicative relationship between devices. Direct electrical, electromagnetic and optical connections and indirect electrical, electromagnetic and optical connections are examples of circuit communication. Two devices are in circuit communication if a signal from one is received by the other, regardless of whether the signal is modified by some other device. For example, two devices separated by one or more of the following—amplifiers, filters, transformers, optoisolators, digital or analog buffers, analog integrators, other electronic circuitry, fiber optic transceivers or satellites—are in circuit communication if a signal from one is communicated to the other, even though the signal is modified by the intermediate device(s). As another example, an electromagnetic sensor is in circuit communication with a signal if it receives electromagnetic radiation from the signal. As a final example, two devices not directly connected to each other, but both capable of interfacing with a third device, such as, for example, a processor, are in circuit communication.

Also, as used herein, voltages and values representing digitized voltages are considered to be equivalent for the purposes of this application, and thus the term "voltage" as used herein refers to either a signal, or a value in a processor representing a signal, or a value in a processor determined from a value representing a signal.

"Signal," as used herein includes, but is not limited to one or more electrical signals, analog or digital signals, one or more computer instructions, a bit or bit stream, or the like.

"Logic," synonymous with "circuit" as used herein includes, but is not limited to hardware, firmware, software and/or combinations of each to perform a function(s) or an action(s). For example, based on a desired application or needs, logic may include a software-controlled processor, microprocessor or microcontroller, discrete logic, such as an application specific integrated circuit (ASIC) or other programmed logic device. Logic may also be fully embodied as software. The circuits identified and described herein may have many different configurations to perform the desired functions.

Any values identified in the detailed description are exemplary, and they are determined as needed for a particular massaging device. Accordingly, the inventive concepts disclosed and claimed herein are not limited to particular values or ranges of values used to describe the embodiments disclosed herein.

Figure 1:
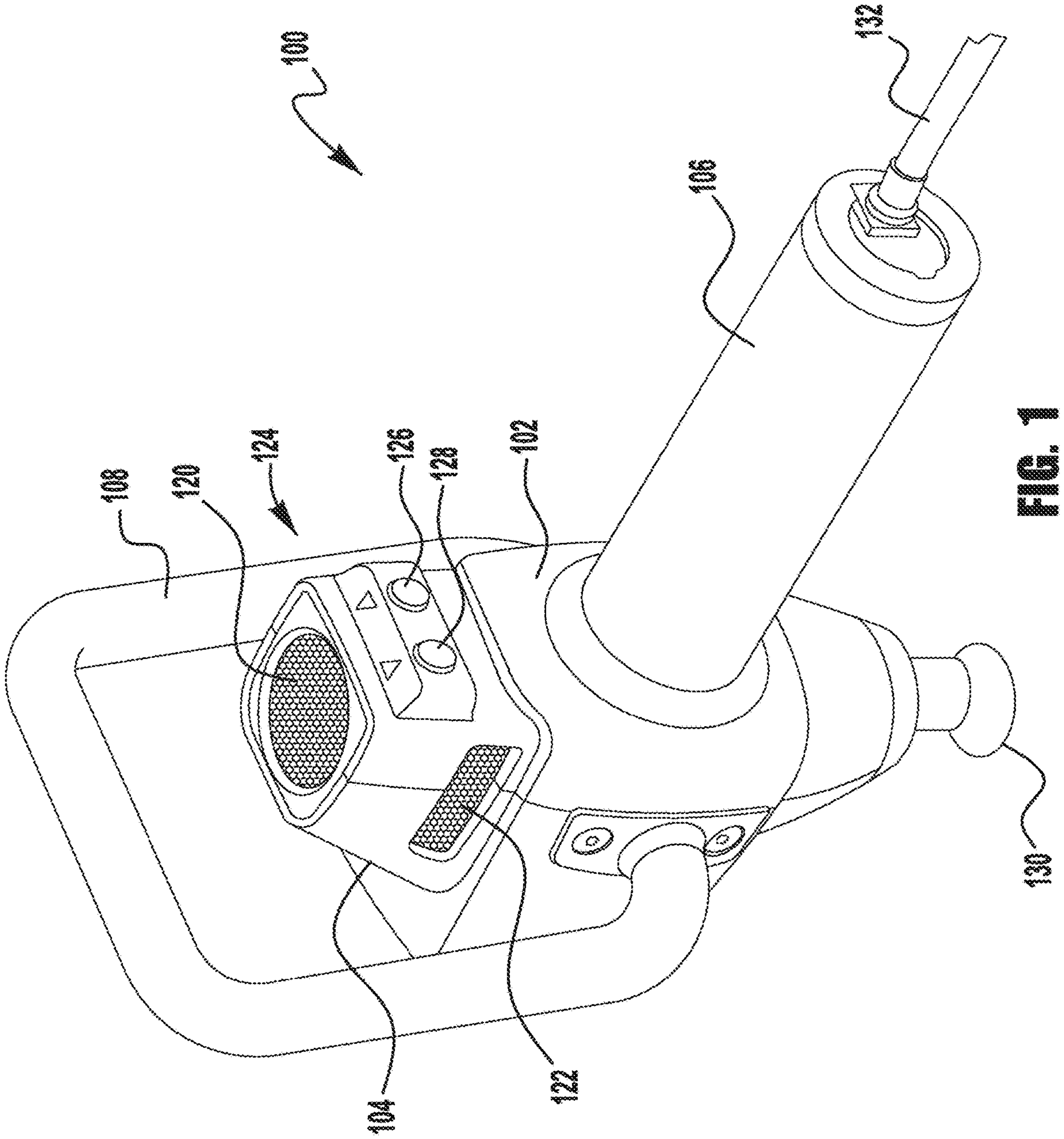
FIG. 1 illustrates a perspective view of an exemplary embodiment of a massaging device.

FIG. 1 is a perspective view of an exemplary embodiment of a hand-held massaging device 100. The exemplary massaging device 100 includes a main housing 102 that houses a motor and a drive unit and an upper housing 104 that includes a heat sink and a fan. In addition, massaging device 100 includes a first handle 106, and a second optional handle 108. Handle 106 has a longitudinal axis that extends away from the housing 102. The massaging device 100 also includes a massaging head 130. As discussed in more detail below, in some embodiments massaging head 130 includes a quick-release connection.

Massaging device 100 includes a control panel 124. In one embodiment, control panel 124 comprises a first momentary pushbutton 126 and a second momentary pushbutton 128. First and second pushbuttons 126, 128 may serve multiple purposes. In one embodiment, pushing the first pushbutton 126 once moves the massaging device 100 to a first preset speed. Pushing the first pushbutton 126 a second time moves the massaging device 100 to a second preset speed. Accordingly, multiple preset speeds may be selected by pushing a single pushbutton. In addition, pushing pushbutton 126 and holding it down may increase the speed of the massaging head until the user releases the pushbutton 126.

In addition, if the massaging device 100 is turned off, pushing second pushbutton 128 once and holding it in for a period of time turns on the massaging device 100. Pushing the second pushbutton 128 in and holding it in for a period of time, such as, for example one second, causes massaging device 100 to turn off. While massaging device 100 is turned on, pushing and releasing second pushbutton 128 decreases the speed of the massaging device 100 to the next lowest preset speed. Pushing and releasing pushbutton 128 again further reduces the speed of the massaging device 100. In some embodiments, the operating speed of the massaging device is generally between about 600 and 3600 strokes per minute.

The control panel 124 is located above handle 106 on upper housing 104. Control panel 124 is located off of the handle 106, which prevents accidental contact between a user's hand and the control panel 124 and allows a user to move her hand to any position on the handle 106 during operation. Preferably, control panel 124 is located so that it is reachable by a user's thumb without the user having to remove her hand from the handle 106. In addition, massaging device 100 includes a power cord 132 for providing power to the massaging device 100.

Although the exemplary control panel 124 illustrates two pushbuttons 126, 128, other controls may be used, such as dials and switches. In addition, visual or audible signals may be generated and displayed on control panel 124. To that extent, control panel 124 may include a visual display (not shown), an audible device (not shown) or the like, such as, for example a speaker, or the like. If a visual or audible device is used, the visual or audible device may be located proximate the pushbuttons or other controls, or may be located apart from such controls.

Upper housing 104 includes an air intake aperture covered by intake grate 120 and one or more air outlet apertures covered by outtake grate(s) 122. As described in more detail below, the heat-generating internal components of massaging device 100 are cooled by air passing through upper housing portion 104.

Figure 2:
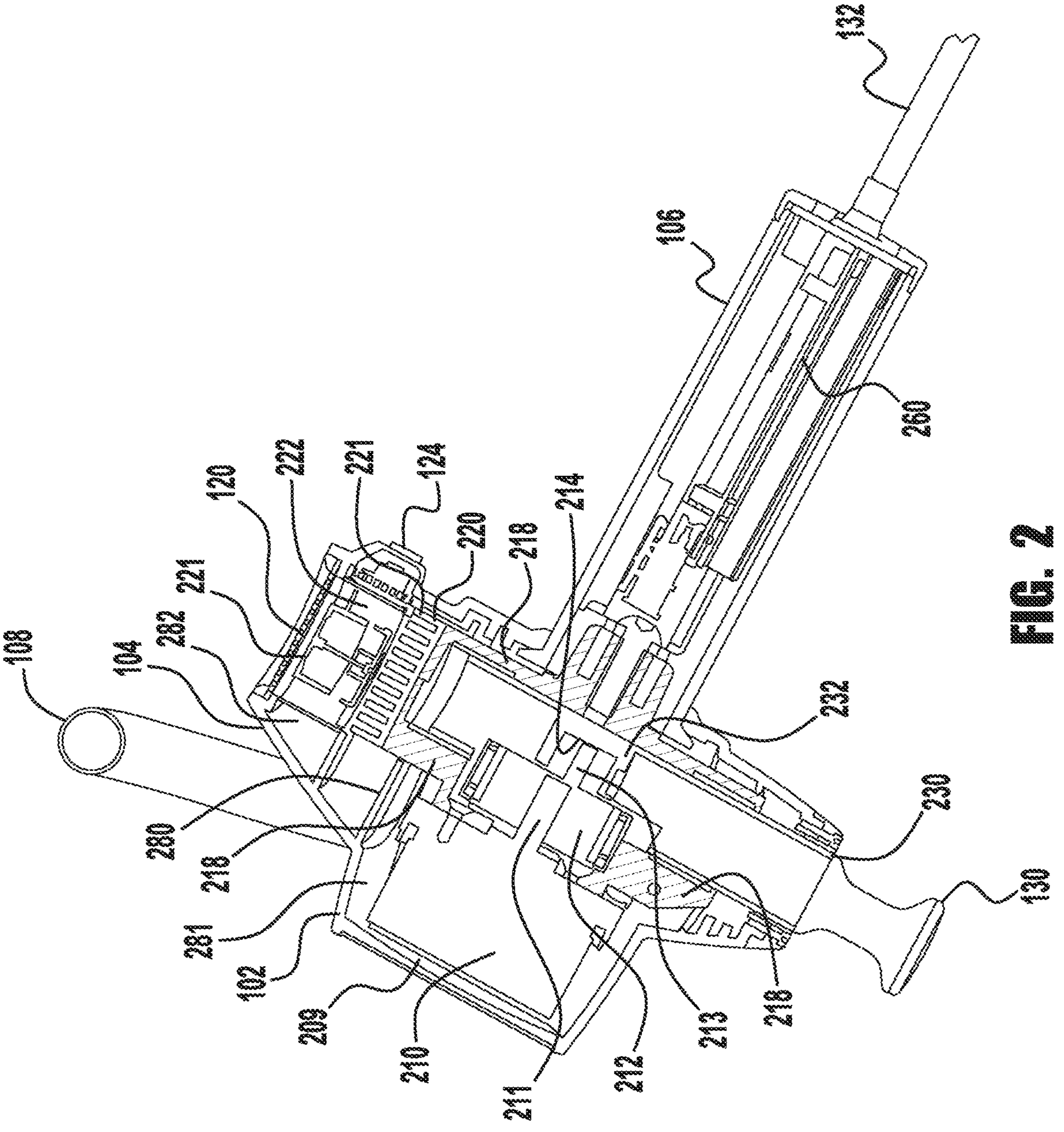
FIG. 2 illustrates a first cross-section of the exemplary massaging device of FIG. 1.
Figure 3:
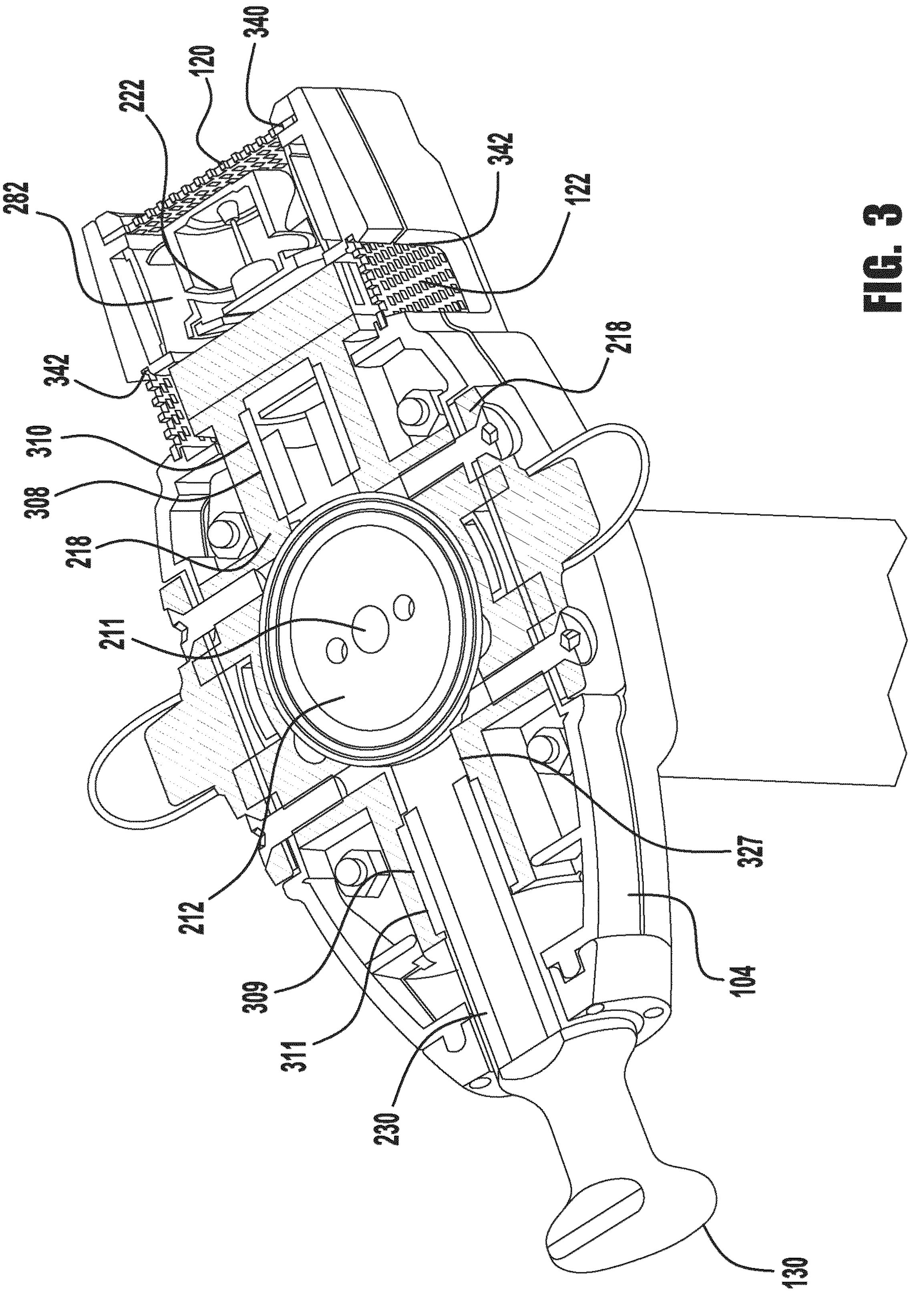
FIG. 3 illustrates a second cross-section of the exemplary massaging device of FIG. 1.

FIGS. 2 and 3 are cross-sections of massaging device 100. Located within handle 106 is control circuitry 260. Control circuitry 260 is in circuit communication with power cord 132, control panel 124, fan 222 and motor 210.

Motor 210 is located in housing 102 opposite handle 106. Motor 210 is a variable speed DC motor; however, motor 210 may be a constant speed motor, an AC motor or the like. In one embodiment, motor 210 has an operating speed of between about 600 and 3600 revolutions per minute (RPMs).

Motor 210 includes a shaft 211 that extends into a flywheel 212. Flywheel 212 includes a cylindrical projecting member or crank pin 213 positioned offset from the centerline 400 (FIG. 4) of the flywheel 212. Crank pin 213 is inserted in an aperture 410 (FIG. 4) of a crank bearing 214. Crank bearing 214 is inserted into a pocket 232 of a piston 230. The piston also has an elongated cutout 402 to receive part of the flywheel 212 for compactness while permitting piston reciprocation. Crank bearing 214 is cuboid in the exemplary embodiment, however, in some exemplary embodiments, crank bearing 214 may cylindrical.

Figure 4:
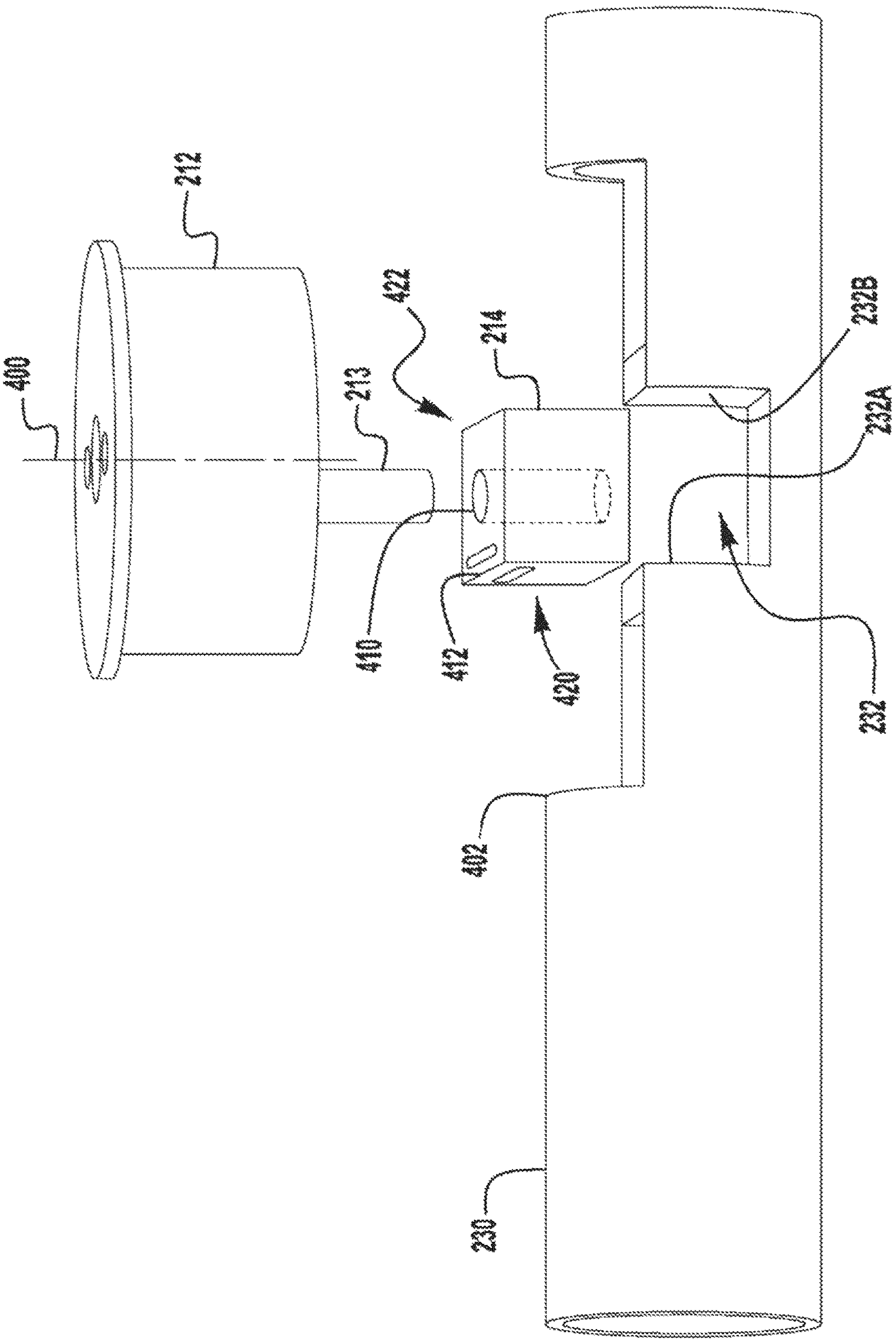
FIG. 4 illustrates an exploded perspective view of an exemplary drive mechanism of the massaging device.

FIG. 4 is an exploded perspective view of piston 230, flywheel 212 and crank bearing 214. Piston 230 may be made of any suitable material, and in some embodiments, piston 230 is made of aluminum. As illustrated in the drawings, in some embodiments, motor 210 is located on one side of the longitudinal axis of piston 230 and handle 106 is located on a second side of the longitudinal axis. Piston 230 includes a pocket 232 (or transverse slot) having a first wall 232A and a second wall 232B. In some embodiments, piston 230 is hollow on either side of pocket 232 to reduce weight.

Flywheel 212 includes a cylindrical projecting member 213. Crank pin 213 is off set from the centerline 400 of flywheel 212. Accordingly, as flywheel 212 rotates, crank pin 213 rotates in a circular path around the centerline 400 of the flywheel 212. Rotation of crank pin 213 causes crank bearing 214 to travel in a circular motion within piston pocket 232 causing reciprocal motion of piston 230.

Piston 230 is restrained by two spaced apart bearings 310, 311 (FIG. 3). Bearing 310 is located on a first side of flywheel 212 and bearing 311 is located on a second side of flywheel 212. Accordingly, piston 230 may only move in a back-and-forth motion along its longitudinal axis. The arrangement of the bearings 310, 311 on both ends of the piston 230 provides for a very sturdy and robust drive mechanism. Because piston 230 is constrained to a linear back-and-forth motion, as crank bearing 214 rotates in a circular motion, it acts against side walls 232A and 232B of pocket 232. This mechanism for converting rotary to linear motion is known as a "Scotch yoke."

In order to correctly assemble the components of a Scotch yoke drive, the pocket 232 (or walls of transverse slot) must be milled larger than the outside dimensions of the crank bearing 214. The gap between the inside of pocket 232 and the outside of crank bearing 214 is typically 0.1 mm inches. Motor 210 rotates at between about 600 and 3600 RPMs and each time the crank bearing 214 switches from moving, for example, toward side wall 232A of pocket 232 to moving toward the other side wall 232B, the bearing block 214 travels the small gap and smacks or strikes the side wall, e.g., side 232B, which causes a significant amount of noise and wear.

Figure 5A:
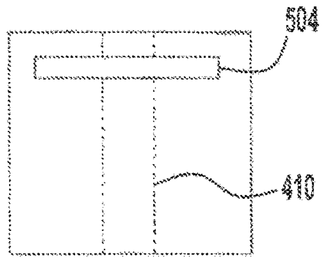
FIGS. 5A and 5B show enlarged side views of a crank bearing having spring bars for use in the exemplary drive mechanism of FIG. 4.
Figure 5B:
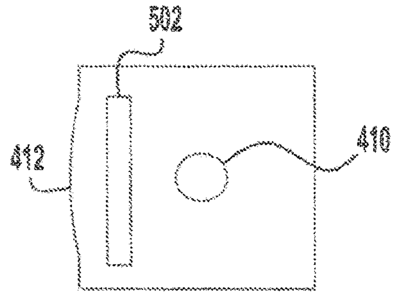

In one exemplary embodiment, crank bearing 214 is made with one spring bar 412. FIG. 5A is an enlarged elevation view of side 420 of crank bearing 214 and FIG. 5B is an enlarged plan view showing top 422 of crank bearing 214. The spring bars 412 are created by milling the outside of the spring block 214 proud by 0.4 mm in the area of the desired spring bar.

As illustrated in FIG. 5A, the surface of spring bar 412 bows outward. The size of the bow is set to increase the width of the crank bearing 214 to be slightly larger (0.4 mm) than the width of the pocket 232. In some embodiments, slots 502 and 504 are milled into the surfaces of side 420 and top 422 below the spring bar 412 to allow spring bar 412 to deflect inwards. In some embodiments, slots 502 and 504 intersect thereby leaving spring bar 412 supported only on each end.

Thus, when crank bearing 214 is inserted into pocket 232, the spring bar 412 contacts the corresponding surface of the pocket 232 and deflects inward which causes crank bearing 214 to fit snuggly in pocket 232. Accordingly, as crank bearing 214 changes directions from, for example, moving toward side wall 232A to moving toward side wall 232B, the spring bar 412 takes up the slack in the gap and prevent noise and wear that would otherwise be generated by the crank bearing 214 striking the side walls 232A, 232B of the pocket 232.

Crank bearing 214 may be made of any suitable material; in some embodiments, crank bearing 214 is made of plastic. Although the exemplary embodiment is shown and described as having one spring bar, exemplary embodiments may have any number of spring bars.

Massaging device 100 includes a drive housing 218. Drive housing 218 is made of a heat conducting material, such as, for example, aluminum and has a longitudinal bore 327 passing therethrough to receive piston 230. As shown in FIG. 3, drive housing 218 includes a first internal cylindrical groove 308 for holding bearing 310 and a second internal cylindrical groove 309 for holding bearing 311. Spaced bearings 310 and 311 mount and guide the piston 230 relative to the drive housing 218. Drive housing 318 surrounds piston 230 and flywheel 212. In some embodiments, drive housing 318 is made up of multiple components, such as an upper drive housing and a lower drive housing.

In addition, motor 210 includes a motor housing 209 that bolts onto drive housing 218. Motor housing 209 is also made of a heat-conducting material, such as, for example, aluminum. Secured to drive housing 218 is heat sink 220. Heat sink 220 includes a plurality of fins 221. Heat sink 220 is made of a heat conducting-material, such as, for example, aluminum.

Main housing 102 contains a first cavity 281. Upper housing 104 contains a second cavity 282. First cavity 281 and second cavity 282 are separated by a barrier 280. Motor housing 209 and drive housing 218 are located in the first cavity 281. Heat sink 220 is located in second cavity 282. The exemplary embodiment describes a main housing 102 and upper housing 104. These may be portions made up of a single structure or multiple structures secured to each other.

Second cavity 282 includes an air inlet aperture 340 which is covered by grate 120 and one or more air outlet apertures 342 covered by one or more grates 122. A fan 222 is located in second cavity 282. When the fan 222 is activated, air enters second cavity 282 through air inlet aperture 340 and passes over cooling fins 221 of heat sink 220, and the air then passes out of second cavity 282 through the one or more air outlets 342. The fan may be activated by a switch (not shown) on control panel 124, activated automatically when the massaging device 100 is turned on, or may be activated by a thermostat (not shown). Thus, the cooling system for massaging device 100 is located in second cavity 282 and is isolated from the other components in the massaging device 100.

In typical massaging devices, cooling air is blown over the motor. Because the massaging devices operate for long periods of time in an atmosphere that is subject to a significant amount of dust and lint because the massaging device is often used on a person wearing clothes, a towel or a robe. Over time, the dust and lint may build up on the motor and cause the prior art massaging devices to overheat. Locating the cooling system in a cavity 282 that is isolated from the rest of the internal components minimizes this type of failure. The air outlet grates 122 may be sized larger to allow any lint and dust to freely pass out of the cavity 282. In addition, the surface of the heat sink 220 is smooth and thus, there will be few pockets for dust and lint to get trapped.

Figure 6:
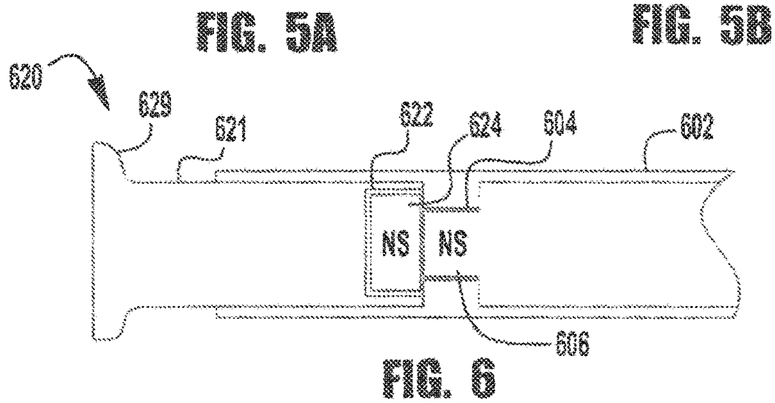
FIGS. 6, 6A and 6B illustrate an exemplary quick-disconnect mechanism for connecting one or more massaging heads to a massaging device.
Figure 6A:
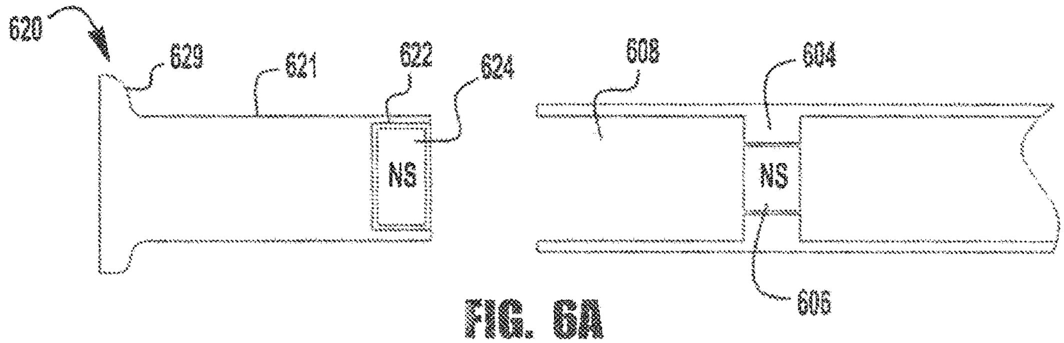

FIGS. 6 and 6A illustrate an exemplary embodiment of a quick-connect system 600 for connecting a massaging head 620 to a piston 602. When providing a deep tissue massage using a massaging device, such as, for example, massaging device 100, it may be desirable to switch massaging heads to work on different muscles or different portions of muscles during the massage. The exemplary quick-connect system 600 allows a user to quickly switch massaging heads 620. Moreover, the exemplary quick-connect system 600 may be used without turning off the massaging device 100.

Quick-connect system 600 includes a piston 602 that has a hollow-end bore 608 for receiving the shaft 621 of a massaging head 620. Located within the bore 608 of piston 602 is a cylindrical seat 604. Cylindrical seat 604 retains a magnet 606. Magnet 606 is illustrated with its north pole located flush with the seat and facing toward the opening in bore 608. Massaging head 620 includes a shaft 621 having a cylindrical pocket 622 at the distal end. Located within the cylindrical pocket 622 is a magnet 624. Magnet 624 is positioned so that its south pole is located at the distal end of shaft 621. Accordingly, when the shaft 621 of massaging head 620 is slid into opening in bore 608, the magnets 606 and 624 are attracted to one another and magnetically hold massaging head 620 firmly in place.

To remove massaging head 620, a user need only apply a sufficient amount of force to separate the two magnets 606, 624. The strength of the magnets 606, 624 are sized to prevent the massaging head 620 from separating from the piston 602 during normal use, and yet allow a user to quickly remove and replace the massaging head 620. In some embodiments the end 626 of the massaging head 620 is rounded, pointed or tapered (not shown) to allow it to easily slip into the opening 608 even while the piston 608 is moving.

Figure 6B:
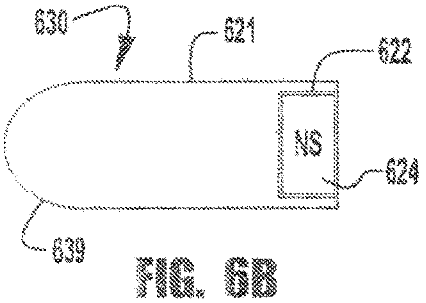

FIG. 6B illustrates another quick-connect massaging head 630. Quick-connect massaging head 630 is substantially the same as massaging head 620 except that the head portion 639 has a different shape than head portion 629 of massaging head 620.

Figure 7:
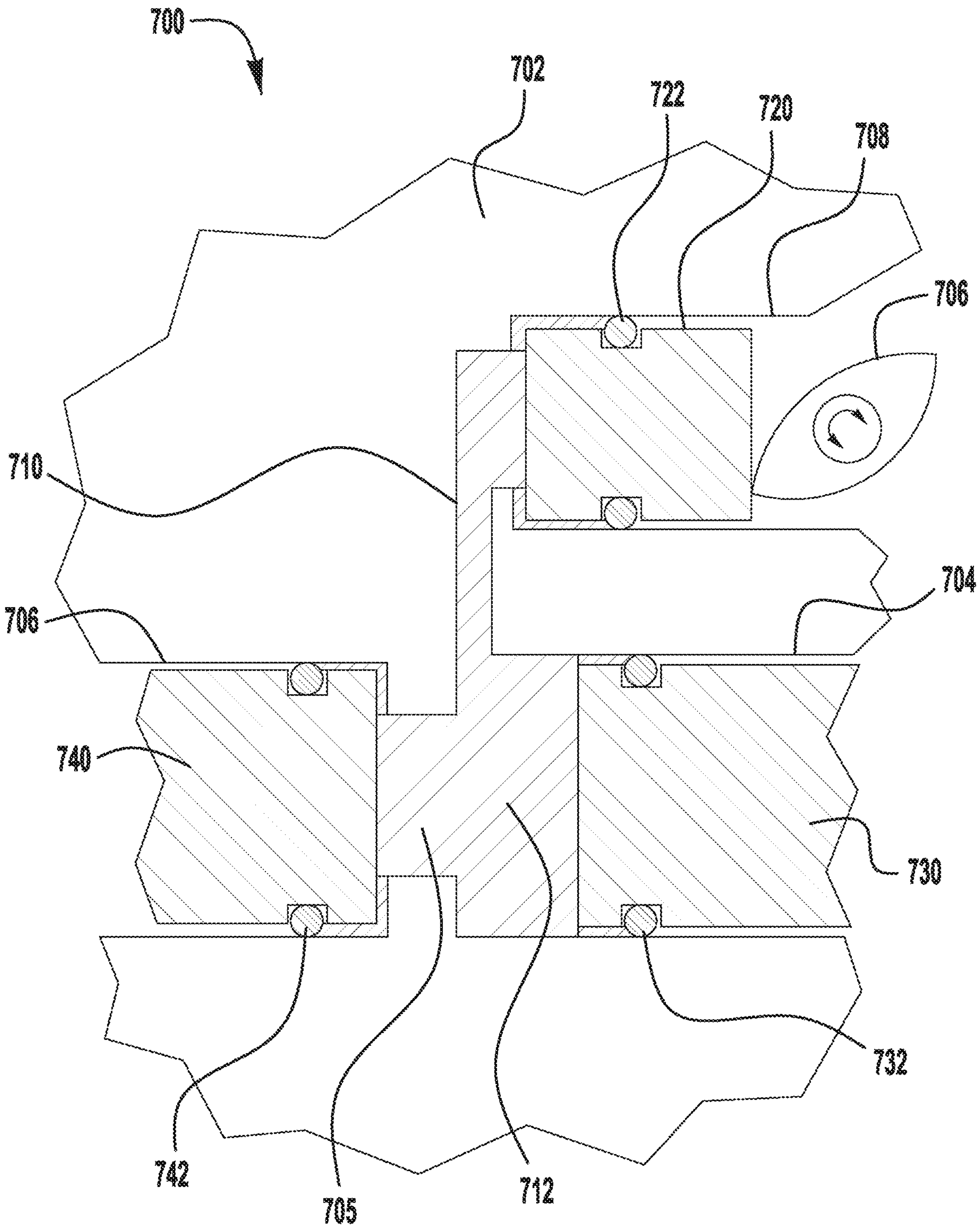
FIG. 7 illustrates a schematic view of an exemplary lost motion control mechanism for varying the stroke of the piston driving a massaging head.

In some instances, it may be desirable to adjust the throw or the stroke length of the massaging head to work on larger or smaller muscle groups, or deeper or shallower points of stress or soreness in the muscles. FIG. 7 illustrates an exemplary embodiment of a lost motion system 700. Although lost motion system 700 is a hydraulic lost motion system, other mechanical lost motion devices may be used in accordance with embodiments of the present invention.

Lost motion system 700 is contained in housing 702. Housing 702 may be similar to drive housing 218 described above except it may need to be larger to accommodate lost motion system 700. Housing 702 includes a floating piston 720 located in first cylindrical bore 708. Floating piston 720 includes a sealing member 722 for forming a seal between floating piston 720 and first cylindrical bore 708. A cam 706 secured to housing 702 may be rotated to adjust the amount of travel that floating piston 720 may move. A passage 710 fluidically connects first cylindrical bore 708 to second cylindrical bore 704.

A drive piston 730 is located in second cylindrical bore 704. Drive piston 730 includes a sealing member 732 to seal between the drive piston 730 and second cylindrical bore 704. Drive piston 730 may be driven in substantially the same way as described above with respect to piston 230. A passage 705 fluidically connects second cylindrical bore 704 and passage 710 to third cylindrical bore 706. Located within third cylindrical bore 706 is an output piston 740.

Output piston 740 includes a sealing member 742, such as, for example, an o-ring to form a seal between drive piston 730 and third cylindrical bore 706. Hydraulic fluid 712 is located in passages 705, 710 and portions of the first, second, and third cylindrical cavities 708, 704 and 706 as illustrated. A massaging head (not shown) is connected to output piston 740.

During operation, if cam 706 is set so that floating piston 720 is retained at the proximate end of first cylindrical bore 708 (as illustrated), movement of the drive piston 730 moves output piston 740 its maximum stroke length. If cam 706 is set so that floating piston 720 moves to adjacent the distal end of first cylindrical bore 708, movement of the drive piston 730 moves output piston 740 its minimum stroke length. The cam may also be selectively rotated to intermediate positions to choose different magnitudes of floating piston movement resulting in different selected magnitudes of output piston movement.

In some embodiments, floating piston 720 is physically connected to the cam or other adjustment mechanism so that it is positioned in a predetermined position and remains stationary during operation of the drive piston 730. Thus, floating piston 720 does not float during operation of the massaging device.

In some embodiments, the lost motion system may be contained in the massaging head itself, or in an adaptor that connects between the piston and the massaging head. Thus, rather than having a cam in the housing of the massaging device, different applicator heads or adaptors having a set lost motion, or variable lost motion systems integral therein may be used. In some embodiments, such adaptors and massaging heads may be adapted with a quick-connect system similar to the ones described with respect to FIGS. 6 and 6A.

Figure 8:
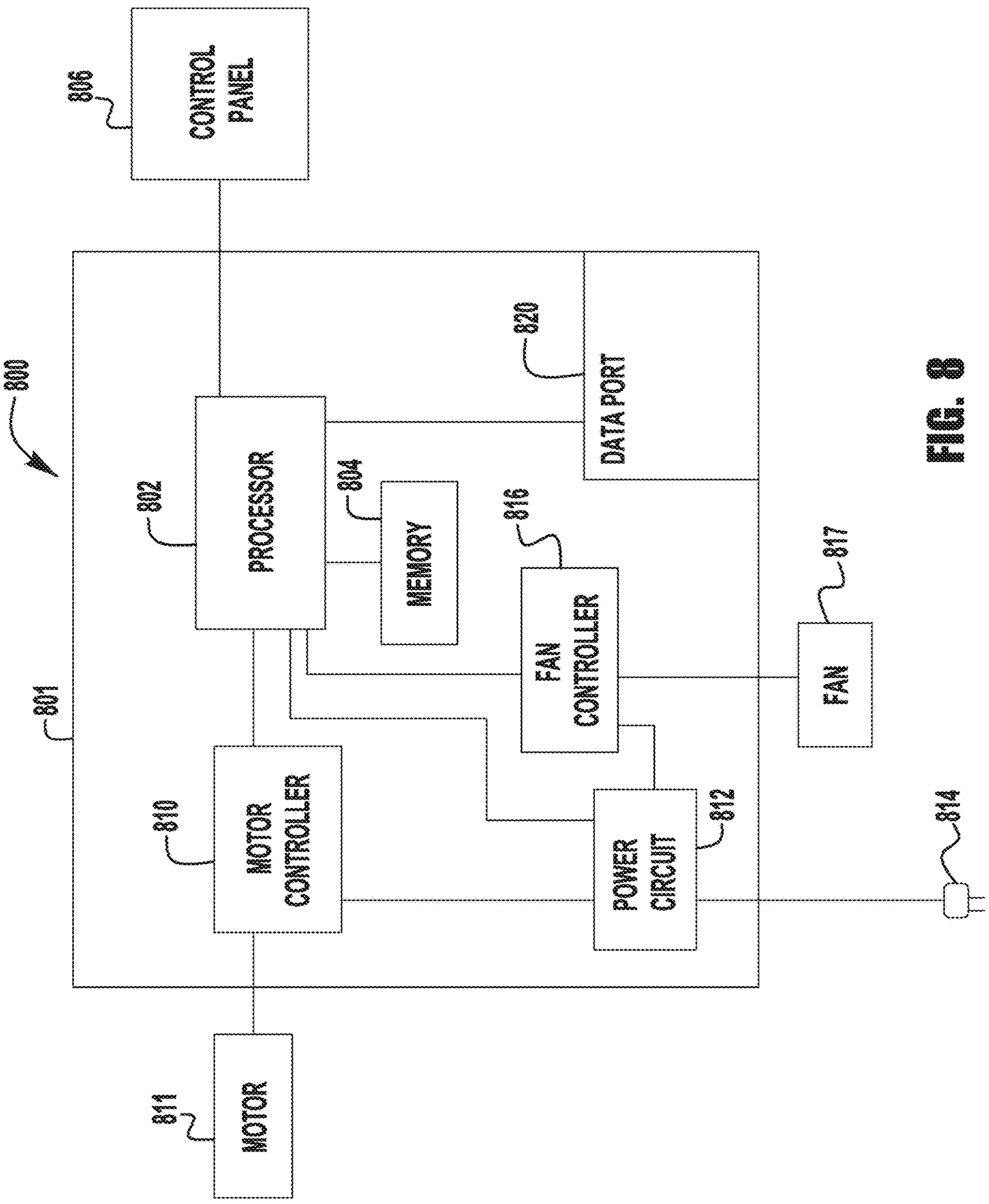
FIG. 8 illustrates an exemplary embodiment of a simplified block circuit diagram for a massaging device.

FIG. 8 illustrates a simplified exemplary electrical schematic diagram 800 of an embodiment of a massaging device. The components disclosed as being on a particular circuit board may be on multiple circuit boards or individually mounted and hardwired to one another. Circuit board 801 includes memory 804, motor control circuitry 810 and fan control circuitry 816, which are in circuit communication with processor 802. Fan control circuitry 816 is in circuit communication with fan 817.

Power circuitry 812 may be included on circuit board 801 or may be located on its own external to the massager. Power circuitry 812 includes the necessary power conditioning circuitry to provide power to both the electronics and the motors. In circuit communication with power circuitry 812 is plug 814. Optionally two or more power circuits may be utilized. All of the connections between power circuitry 812 and the other components may not be shown in FIG. 8; however, those skilled in the art have the required knowledge to provide power to the devices that require power. Motor control circuitry 810 is in circuit communication with drive motor 811. Drive motor 811 is used to drive the piston and massaging head as described above.

Memory 804 is a processor readable media and includes the necessary logic to operate the massaging device. Examples of different processor readable media include Flash Memory, Read-Only Memory (ROM), Random-Access Memory (RAM), programmable read-only memory (PROM), electrically programmable read-only memory (EPROM), electrically erasable programmable read-only memory (EEPROM), magnetic disk, and optically readable mediums, and others. Still further, the processes and logic described herein can be merged into one large process flow or divided into many sub-process flows. The order in which the process flows herein have been described is not critical and can be rearranged while still accomplishing the same results. Indeed, the process flows described herein may be rearranged, consolidated and/or reorganized in their implementation as warranted or desired.

In addition, processor 802 is in circuit communication with control panel 806. Control panel 806 includes any desired pushbuttons, dials, displays or the like. Control panel 806 provides the operator interface to operate and control the massaging device.

Processor 802 is also in circuit communication with data connection 820. Representative data connections 820 include an Ethernet wire, Bluetooth, WiFi, optical transmitter/reader, an IR reader and the like. Combinations of two or more different data connections 820 may be used. Data connection 820 may be used to transmit data to an outside device, such as, for example, a computer or hand-held portable device. Various uses for transmitting such data are described below.

In some embodiments, processor 802 includes logic to collect and store data related to use of the massaging device.

Exemplary types of data may include usage rates, operating times or the like. In some embodiments, different massaging heads include an RFID chip and when inserted into the massaging device, an RFID reader (not shown) identifies and stores the type of massaging head utilized. In some embodiments, a customer number may be associated with the data. This data may be used to determine lease rates of the massaging device, for calculating cost/benefit analysis, or for setting up customized massages.

In some embodiments, data may be uploaded from a computer or hand-held portable device to the massaging device. Such data may include customized massaging programs tailored for individual needs. In some embodiments, the customized massaging program may be reflective of prior massages given to a customer that were particularly well-received by the customer.

In some embodiments, the customized massaging program may indicate to the user on a display on the control panel 806 massage times, locations, type of massage head to use or the like to ensure covering the desired locations with the customized massage.

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed is:

1. A percussive massager comprising:
- a housing;
- a handle portion on the housing;
- a piston having a proximal end and a distal end, the distal end of the piston having a bore;
- a motor operatively connected to the proximal end of the piston, wherein the motor is configured to cause the piston to reciprocate at a first speed;
- a drive mechanism that determines a predetermined stroke length of the piston;
- a quick-connect system comprising the distal end of the piston and a first massaging head, wherein the quick-connect system allows a proximal end of the first massaging head to be inserted into or removed from the bore while the piston reciprocates the predetermined stroke length at the first speed; and
- a flywheel operatively connected between the motor and the piston;
- wherein the handle portion and the motor are on opposite sides of a plane along which the flywheel rotates.

2. The percussive massager of claim 1, wherein the motor is configured to cause the piston to reciprocate at a second speed.

3. The percussive massager of claim 1, further comprising:
- a control panel positioned on an exterior of the housing.

4. The percussive massager of claim 3, wherein the control panel is configured to display one or more visual indicators.

5. The percussive massager of claim 1, wherein the handle portion is on an opposite side of the flywheel with respect to the motor.

6. The percussive massager of claim 1, wherein the motor has an output shaft that is configured to rotate about a rotation axis, and wherein the drive mechanism comprises:
- the flywheel operatively connected to the output shaft of the motor to rotate about a flywheel axis, the output shaft extending into the flywheel along the flywheel axis; and
- a crank pin extending from the flywheel, the crank pin being operatively connected to the piston.

7. The percussive massager of claim 6, wherein the motor and the handle portion are on opposite sides of a second plane perpendicular to the flywheel axis that extends through the flywheel.

8. The percussive massager of claim 6, wherein an offset between the flywheel axis and an axis of the crank pin determines the predetermined stroke length of the piston.

9. The percussive massager of claim 6, wherein the motor is directly connected to the flywheel, and wherein the crank pin is directly connected to the flywheel.

10. The percussive massager of claim 1, wherein the bore comprises a substantially cylindrical bore.

11. The percussive massager of claim 1, further comprising a substantially cylindrical structure within the bore.

12. The percussive massager of claim 11, wherein the substantially cylindrical structure comprises a cylindrical seat.

13. The percussive massager of claim 11, wherein the substantially cylindrical structure comprises a magnet.

14. The percussive massager of claim 1, wherein the proximal end of the first massaging head has a pocket to receive the distal end of the piston.

* * * * *